United States Patent [19]

Levitan

[11] Patent Number: 5,421,020
[45] Date of Patent: May 30, 1995

[54] COUNTER REGISTER IMPLEMENTATION FOR SPECULATIVE EXECUTION OF BRANCH ON COUNT INSTRUCTIONS

[75] Inventor: David S. Levitan, Austin, Tex.

[73] Assignee: International Business Machines Corporation, Armonk, N.Y.

[21] Appl. No.: 2,445

[22] Filed: Jan. 8, 1993

[51] Int. Cl.$^6$ .............................................. G06F 9/22
[52] U.S. Cl. .................................. 395/800; 364/262.4; 364/263.1; 364/261.7; 364/247; 364/DIG. 1; 395/375
[58] Field of Search ................ 395/800, 375, 425, 725, 395/500, 550, 775, 325, 400, 575, 650; 364/DIG. 1, DIG. 2

[56] References Cited

U.S. PATENT DOCUMENTS

| | | | |
|---|---|---|---|
| 4,760,519 | 7/1988 | Papworth et al. | 395/725 |
| 4,920,477 | 4/1990 | Colwell et al. | 395/425 |
| 4,942,520 | 7/1990 | Langendorf | 395/425 |
| 5,101,484 | 3/1992 | Kohn | 395/375 |
| 5,136,696 | 8/1992 | Beckwith et al. | 395/375 |
| 5,142,634 | 8/1992 | Fite et al. | 395/375 |

OTHER PUBLICATIONS

"Implementing Precise Interrupts in Pipelined Processors", James E. Smith, et al., Transactions on Computers, May 1988, No. 5.
"Looping in MSIS", IBM Technical Disclosure Bulliten, vol. 36, No. 1, Jan. 1993, pp. 262–264.
"Parallelization of Loops With Exits on Pipelined Architectures", P. Tirumalai, et al. Supercomputing '90, Nov. 12, 1990, pp. 200–212.
Harold S. Stone, High–Performance Computer Architecture, Chapter 3, New York, U.S., 1987, pp. 150–155 and 168–171.

Primary Examiner—Eric Coleman
Assistant Examiner—Daniel H. Pan
Attorney, Agent, or Firm—Michael A. Davis; Andrew J. Dillon

[57] ABSTRACT

A data processing system for speculatively executing instructions. The data processing system includes a memory for storing instructions at addresses which can be generated by a branch unit in a processor. The processor also has a count register for storing an update value, a dispatch version value and a completion version value. A fetcher connected to the branch unit fetches instructions from memory based upon addresses calculated by the branch unit. The branch unit handles processing of conditional branch instructions. To do so, means for initializing the update value and the dispatch version value for branch control are provided. Further included are means responsive to completion of initialization for copying the update value as the completion version value. The system further includes means responsive to dispatch of a conditional branch instruction for examining the dispatch version value to determine if a branch should be taken and then decrementing the dispatch version value. Means responsive to completion of the branch provide for decrementing contents of a completion version register. Finally, means responsive to occurrence of an interrupt prior to completion of the branch provide for replacing the dispatch version value with the completion version value to restore the system to a state prior to the speculative execution of instructions.

6 Claims, 4 Drawing Sheets

| Stage | Cycle 1 | 2 | 3 | 4 | 5 | 6 | 7 |
|---|---|---|---|---|---|---|---|
| Queue 3 | bc |  | T2 | T3 | S3 | S4 | S5 |
| Queue 2 | cmp | cmp | T1 | T2 | S2 | S3 | S4 |
| Queue 1 | alu | cmp | T0 | T1 | S1 | S2 | S3 |
| Decode | alu | alu | cmp | T0 | S0 | S1 | S2 |
| Execute | alu | alu | alu | cmp |  | S0 | S1 |
| W/B | alu | alu | alu | glu | cmp |  | S0 |

*Fig. 2  Prior Art*

COUNTER REGISTER IMPLEMENTATION FOR SPECULATIVE EXECUTION OF BRANCH ON COUNT INSTRUCTIONS

BACKGROUND OF THE INVENTION

1. Technical Field

The invention relates to data processing systems and in particular to a method and system for supporting speculative execution of program instructions. Still more particularly, the invention relates to preservation of non-conditional state information for recovery after speculative execution fails.

2. Description of the Related Art

Designers of data processing systems are continually attempting to enhance the performance of such systems. One technique for enhancing data processing system efficiency is the achievement of short cycle times and a low Cycle's-Per-Instruction (CPI) ratio in the system processor. An example of the application of these techniques to data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a superscalar implementation, which means that multiple instructions are issued and executed concurrently.

Processor architecture relates to the combination of registers, arithmetic units and control logic to build the computational elements of a computer. An important consideration during building of a processor is the instruction set it will provide. An instruction is a statement which specifies an operation and the values or locations of its operands. An instruction set is the collection of all such valid statements for a particular machine.

As originally conceived, RISC machines would execute one instruction per machine cycle. To this end all instruction were of one length and fit a scheme compatible with a pipeline implementation. Simplicity in the instruction set was the design objective. This allowed further reduction in the cycle time compared with so called complex instruction set computers (CISC). However, some of the benefits of RISC were offset by increases in traffic between the processor and the main memory for a computer. This occurred because a RISC machine requires more instruction instances to do a task than a CISC machine with its more powerful instruction set.

Concurrence in issuance and execution of multiple instructions requires independent functional units that can execute with a high instruction bandwidth. The RS/6000 system achieves this by utilizing separate branch, fixed point and floating point processing units which are pipelined in nature. The branch processing unit handles conditional branch instructions. In common with other RISC designs, complex decoding logic no longer required to decode instructions has been utilized to provide an instruction cache on the processor chip. This reduces traffic between the processor and memory, and makes fetches of instructions extremely fast.

An instruction subset of great interest is that relating to conditional branches. Conditional branch instructions are instructions which dictate the taking of a specified conditional branch within an application in response to a selected outcome of the processing of one or more other instructions. A practical example is a Fortran do-loop. Conditional branch instruction have long been a source of difficulty for pipeline computers (including RISC systems). By the time a conditional branch instruction propagates through a pipeline queue to an execution position within the queue, it will have been necessary to load instructions corresponding to one branch into the queue behind the conditional branch instruction prior to resolving the conditional branch, in order to avoid run-time delays. This requires a choice be made as to which instruction will follow the conditional branch without knowing the outcome of processing the related instructions. The choice can prove wrong.

The execution of instructions prior to the final possible definition of all conditions effecting execution is called speculative execution. To wait for the outcome of conditional branches, or the arrival of all possible interrupts, would make full concurrent processing impossible. Thus, some scheme for processor recovery from speculative execution of instructions must be provided if full use of concurrent execution of instructions is to be made. Upon determination that execution is proceeding down an incorrect branch an interrupt may be generated to change the course of execution. In responding to an interrupt, the processor is returned to the last nonspeculative execution step.

Experience has demonstrated that use of some complex operations in RISC machines can improve performance. This in part stems from the nature of currently preferred technology for implementation of processors, i.e. very large scale integration (VLSI). Minimization of area used on a chip is now more important than minimizing the number of devices used to implement the processor. Hence, some complex instructions have begun infiltrating into RISC based designs. The criteria for inclusion is minimum utilization of space. One instruction in the RS/6000 instruction set allows execution of a branch on count loop. The branch on count instruction is a one step instruction replacing what was formerly done in three instructions. Substitution of a single instruction for three instructions was enabled by providing a dedicated count register. However, this arrangement does not in itself support speculative execution. Implementation of the count register could be done by a mechanism provided in RS/6000 machines for register rename, but the value for the count register would not be known during the dispatch cycle resulting in some loss of machine cycles. Desirable is a hardware implementation of the branch on count loop which uses a minimum amount of area on a processor chip.

SUMMARY OF THE INVENTION

It is therefore one object of the invention to provide an improved method system for supporting speculative execution of program instructions.

It is another object of the invention to provide preservation of conditional state information for recovery after speculative execution fails.

The foregoing objects are achieved as is now described. The invention provides a data processing system for speculatively executing instructions. The data processing system includes a memory for storing instructions at addresses which can be generated by a branch unit in a processor. The processor also has a count register for storing an update value, a dispatch version value and a completion version value of a branch control count. A fetcher connected to the branch unit fetches instructions from memory based upon addresses calculated by the branch unit. The branch unit handles processing of conditional branch instructions. To do so, a process for initializing the update value and the dispatch version value for branch control is provided. Further included are a process responsive to completion of initialization for copying the update value as the completion version value. The system further includes a process responsive to dispatch of a conditional branch instruction for examining the dispatch version value to determine if a branch should be taken and then decrementing the dispatch version value and a process responsive to completion of the branch provide for decrementing contents of a completion version register. Finally, a process responsive to occurrence of an interrupt prior to completion of the branch provides for replacing the dispatch version value with the completion version value to restore the system to a state prior to the speculative execution of instructions.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a reservation table illustrating the manipulation of instruction queue content in a prior art data processing system utilizing an instruction queue.

DETAILED DESCRIPTION OF THE INVENTION

Figure 1:
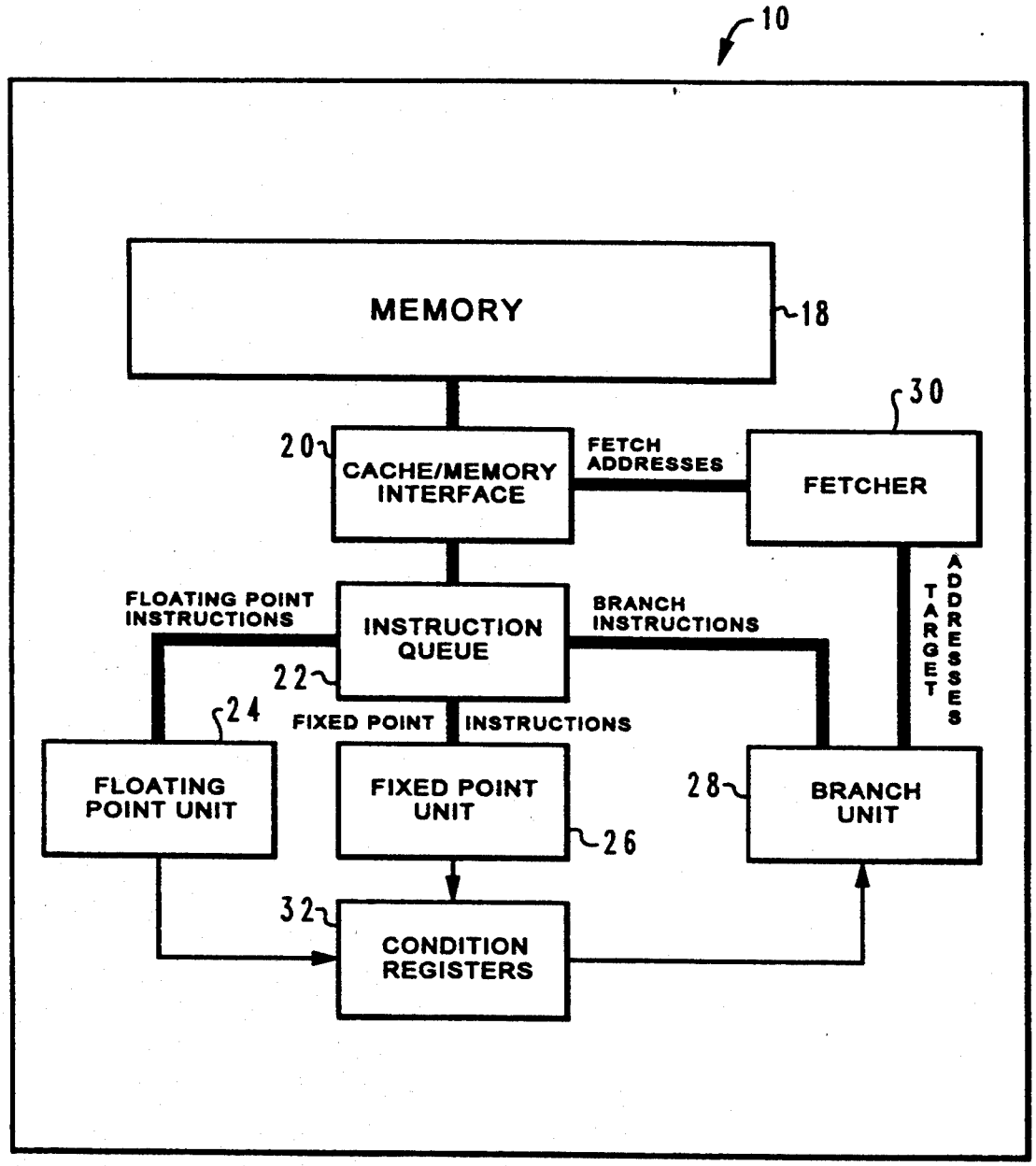
FIG. 1 is a high level block diagram of a superscalar computer system which may be utilized to implement the method and system of the present invention.

With reference now to the figures and in particular with reference to FIG. 1, there is depicted a high level block diagram of a superscalar computer system 10 which may be utilized to implement the method and system of the present invention. As illustrated, computer system 10 preferably includes a memory 18 which is utilized to store data, instructions and the like. Data or instructions stored within memory 18 are preferably accessed utilizing cache/memory interface 20 in a method well known to those having skill in the art. The sizing and utilization of cache memory systems is a well known subspecialty within the data processing art is not addressed within the present application. However, those skilled in the art will appreciate that by utilizing modern associative cache techniques a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a superscalar computer system the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such superscalar computer systems, instruction queue 22 is utilized to dispatch instructions to multiple execution units. As depicted within FIG. 1, computer system 10 includes a floating point processor unit 24, a fixed point processor unit 26, and a branch processor unit 28. Thus, instruction queue 22 may dispatch between zero and three instructions during a single cycle, one to each execution unit.

In addition to sequential instructions dispatched from instruction queue 22, so-called "conditional branch instructions" may be loaded into instruction queue 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as computer system 10, the presence of a conditional branch instruction within the instruction queue is detected and an outcome of the conditional branch is predicted. As should be apparent to those having skill in the art when a conditional branch is predicted as "not taken" the sequential instructions within the instruction queue simply continue along a current path and no instructions are altered. However, if the prediction as to the occurrence of the branch is incorrect, the instruction queue must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken" is incorrect the target instructions must be purged and the sequential instructions which follow the conditional branch instruction in program order must be retrieved.

As illustrated, computer system 10 also preferably includes a condition registers 32. Condition registers 32 are utilized to temporarily store the results of various comparisons which may occur utilizing the outcome of sequential instructions which are processed within computer system 10. Thus, floating point processor unit 24 and fixed point processor unit 26 and are coupled to condition register 32. The status of a particular condition within condition registers 32 may be detected and coupled to branch processor unit 28 in order to generate target addresses, which are then utilized to fetch target instructions in response to the occurrence of a condition which initiates a branch.

Thereafter, branch processor unit 28 couples target addresses to fetcher 30. Fetcher 30 calculates fetch addresses for the target instructions necessary to follow the conditional branch and couples those fetch addresses to cache/memory interface 20. As will be appreciated by those having skill in the art, if the target instructions associated with those fetch addresses are present within cache/memory interface 20, those target instructions are loaded into instruction queue 22. Alternately, the target instructions may be fetched from memory 18 and thereafter loaded into instruction queue 22 from cache/memory interface 20 after a delay required to fetch those target instructions.

The manipulation of instruction queue content in a prior art data processing system utilizing an alternate instruction queue is illustrated in FIG. 2 within reservation table 36 therein. FIG. 2 depicts a table illustrating manipulation of instruction queue data content through seven consecutive cycle times. It may be seen that at cycle time 1, the instruction queue includes a conditional branch instruction (bc), a compare instruction (cmp) and four arithmetic logic unit (alu) instructions. Upon the detection of the conditional branch instruction within queue 3 of the prior art instruction queue, the sequential instructions within the queue are loaded into an alternate instruction queue (not shown). Thereafter, a request for target instructions associated with the conditional branch is initiated at cycle and those instructions are loaded into the instruction queue at cycle 3. These instructions are based upon the prediction that the conditional branch associated with the conditional branch instruction will be "taken."

Thereafter, at cycle 4, the compare (cmp) instruction has propagated to the execution position within the instruction queue and the conditional branch instruction is "resolved." In the event the resolution of the conditional branch instruction indicates that the conditional branch is "not taken" the sequential instructions previously loaded into the alternate instruction queue are once again loaded into the primary instruction queue, as depicted at cycle 5. Cycles 6 and 7 within the instruction queue of FIG. 2 indicate the subsequent processing of additional sequential instructions. As illustrated, only a single empty cycle is present within the instruction queue following the misprediction of the conditional branch instruction. However, as described above, the implementation of this prior art technique requires the utilization of an alternate instruction queue.

Figure 3:
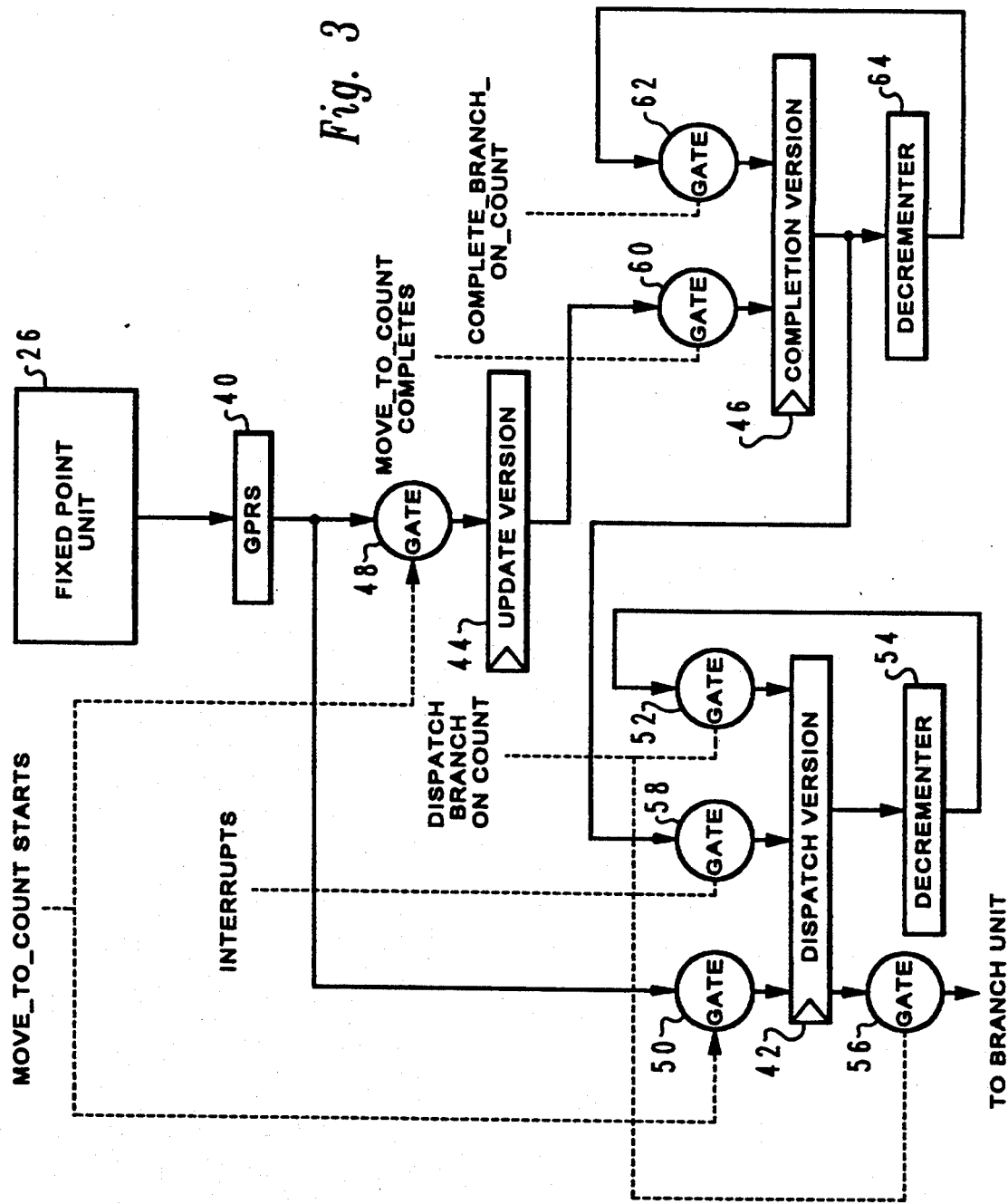
FIG. 3 is a schematic illustration of a branch on count register architecture in accordance with a preferred embodiment of the invention.

Referring to FIG. 3, a block diagram schematic of a region of registers is depicted, including general purpose registers 40 and three dedicated registers used to implement a branch on count instruction with predictive branching, speculative execution of instructions and recovery from speculative execution of instructions along a wrong branch. The three dedicated registers include a dispatch version register 42, an update version register 44 and a completion version register 46.

Functionally, the dispatch version register 42 provides a dispatch stage version of the count to be used for address generation. The dispatch stage version always leads the completion stage version of the count stored in completion version register 46. The completion stage version count is the count corresponding to the last speculatively executed and confirmed instruction. The contents of update version register 44 correspond to the count for an instruction speculatively executed, which will be copied into register 46 when confirmed. The purpose of the update version of the count is to enable decrementing of the dispatch version before the MOVE_TO_COUNT instruction completes execution. The MOVE_TO_COUNT instruction may itself be speculatively executed.

The movement of data into registers 42, 44 and 46 is controlled by occurrence of certain instructions from the processor instruction set. The instructions are generated by a compiler and decoded by conventional control logic of the processor unit. Speculative execution of a branch of a loop in a program is initiated by fixed point unit 26. A store instruction loading a count value into general purpose register 40 is executed. Subsequently execution of a MOVE_TO_COUNT instruction begins, resulting in application of a gate control signal to gates 48 and 50. As a result the contents of general purpose register 40 are copied into dispatch version register 42 and update version register 44.

Upon dispatch of a BRANCH_ON_COUNT instruction the contents of register 42 are examined to determine if the branch should be taken or if execution of steps of the program should fall through sequentially. A gate control signal is applied to gates 52 and 56, which results in the application of the contents of register 42 to branch unit 28 and copying into register 42 of the prior contents of the register less 1 by route of decrementer 54.

If an interrupt is taken prior to completion of instructions following a BRANCH_ON_COUNT instruction, indicating, for example, that the wrong sequence of instruction was followed, a gate control signal is applied to gate 58. Gate 58 is used to copy the contents of completion version register 46 into dispatch version register 42. This returns the state of dispatch version register 42 to that preceding execution of any speculative instruction not yet confirmed.

As previously described, gate 48 controls the copying of the contents of general purpose register 40 to update version register 44 with initiation of a MOVE_TO_COUNT instruction. The contents of update register 44 are copied to completion version register 46 by gate 60 with completion of the MOVE_TO_COUNT instruction. There the initial count is preserved until a branch following a BRANCH_ON_COUNT instruction is completed and confirmed. Upon completion logic of the processor signal removing the tentative markings from the results of the branch, a gating signal is applied to gate 62 resulting in the contents of register 46 being decremented by decrementer 64 and the result being copied back into register 46.

Figure 4:
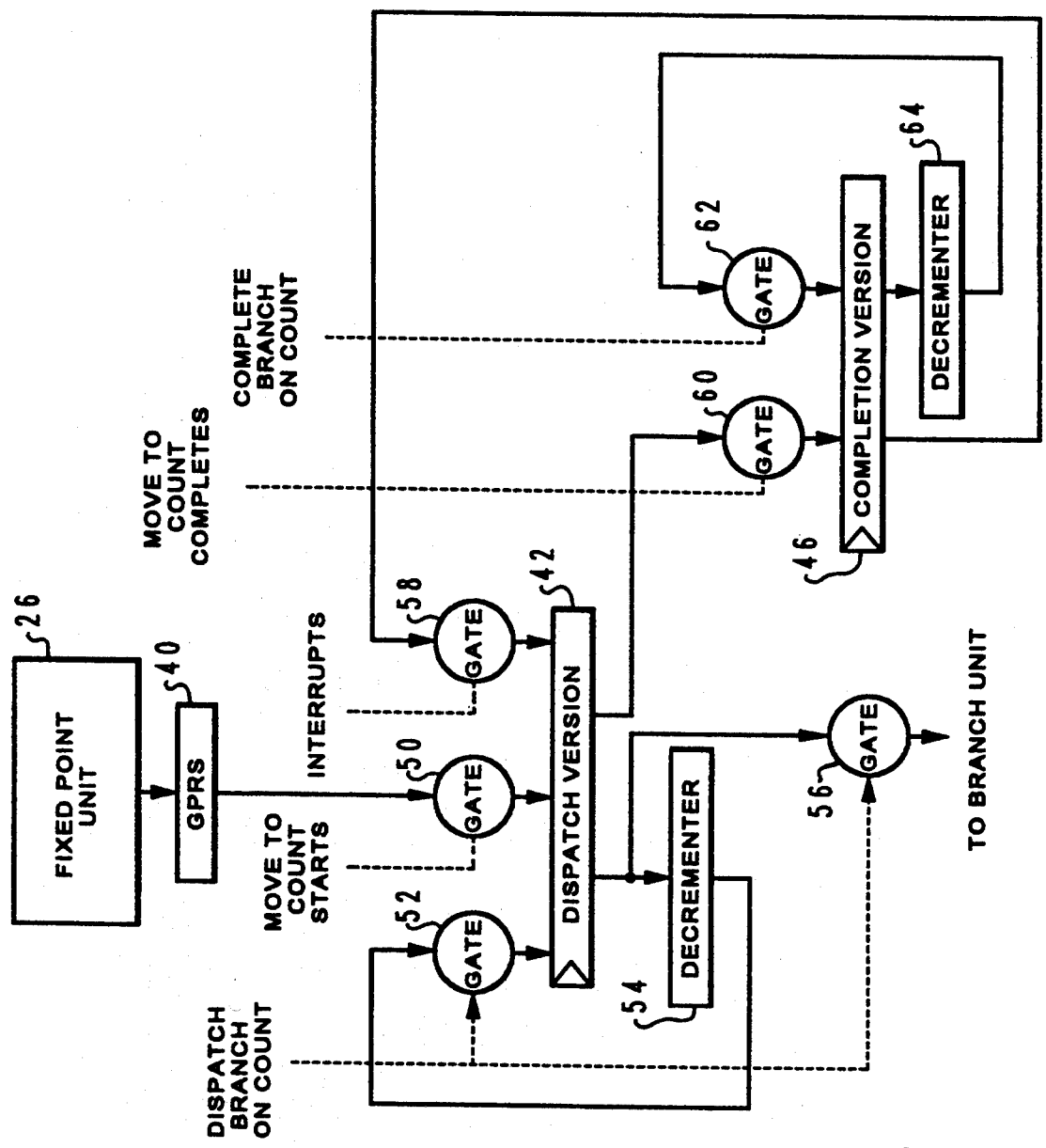
FIG. 4 is a schematic illustration of a branch on count register architecture in accordance with a second preferred embodiment of the invention.

FIG. 4 illustrates a simplified but lower performance embodiment of the invention, in which gate 48 and update version register 44 have been eliminated. The movement of data into dispatch version register 42 and completion version register 44 is controlled by signals to various gates. The completion version register 46 now receives its data from the dispatch version register 42, rather than the update version register. The signals are similar to those discussed with reference to FIG. 3, but occur at somewhat different times. The most important change in timing is that for a BRANCH_ON_COUNT instructions, which cannot execute until a MOVE_TO_COUNT instruction completes and the completion version register 46 has been loaded.

With initiation of a MOVE_TO_COUNT instruction, a gate signal is applied to gate 50 copying the contents of general purpose register 40 into dispatch version register 42. When the MOVE_TO_COUNT completes a signal applied to gate 60 results in the contents of the dispatch version register 42 being applied to completion version register 46. Now a DISPATCH_ON_COUNT instruction can be executed. The handling of BRANCH_ON_COUNT instructions, interrupts and complete BRANCH_ON_COUNT is identical to the first embodiment.

While the invention has been particularly shown and described with reference to a preferred embodiment, it will be understood by those skilled in the art that various changes in form and detail may be made therein without departing from the spirit and scope of the invention.

What is claimed is:

1. A processor unit for a data processing system including a branch unit for operating on conditional branch on count instructions and calculating target addresses for use in fetching instructions from a memory device, the processor unit comprising:
   a source of an initial version of a count value related to a conditional branch;
   an update register for storing the initial version of the count value;
   a register for storing a dispatch version of the count value;
   a register for storing a completion version of a count value corresponding to nonspeculatively executed instructions;
   means responsive to beginning execution of a move to count instruction for loading the initial version of the count value into the register for storing the dispatch version;
   means responsive to completion of a move to count instruction for moving the initial version of the count value to the register for storing the completion version and for transferring the content of the update register to the register for storing the completion version;
   means responsive to dispatch of a branch on count instruction for decrementing the dispatch version;
   means responsive to completion of a branch for decrementing the contents of the register for storing the completion version; and
   means responsive to an interrupt for loading the contents of the register for storing the completion version into the register for storing the dispatch version.

2. In a data processing system having a branch unit for processing conditional branch on count instructions, a method of speculatively executing instructions recovered from memory based upon addresses calculated by a branch unit, the method including the steps of:
   initializing a dispatch version register with a count value for control of the conditional branch by loading a value into a general purpose register of the processor and executing a move of the contents of the general purpose register into the dispatch version register and into an update register;
   upon completion of initialization of the dispatch version register, copying the contents of the update register into a completion version register;
   responsive to dispatch of a conditional branch instruction, examining contents of a dispatch version register to determine a branch to be taken and then decrementing the contents of the dispatch version register;
   responsive to completion of a taken branch, decrementing contents of the completion version register; and
   upon occurrence of an interrupt prior to completion of the taken branch, copying the contents of the completion version register to the dispatch version register.

3. A method as set forth in claim 2, and further comprising:
   dispatching a branch on count instruction without regard to the number of uncompleted branch on count instructions already queued.

4. A method as set forth in claim 2, and further comprising executing the steps subsequent to the step of copying the contents of the update register into the completion version register as a loop.

5. A data processing system for speculatively executing instructions including:
   memory for storing instructions;
   a dispatch version register and a completion version register;
   means for fetching instructions from memory based upon calculated addresses;
   a branch unit for processing conditional branch on count instructions;
   means coupled to said branch unit for initializing the contents of the dispatch version register for branch control by loading a value into a general purpose register of the processor and executing a move of the contents of the general purpose register into the dispatch version register;
   means responsive to completion of initialization for copying initialization data into the completion version register;
   means for dispatching branch on count instructions without regard to the number of uncompleted on count instructions already queued;
   means responsive to dispatch of a conditional branch on count instruction for examining the dispatch version value to determine e branch to take and then decrementing the contents of the dispatch version register;
   means responsive to completion of a branch for decrementing contents of the completion version register; and
   means responsive to occurrence of an interrupt prior to completion of the branch for replacing the content of the dispatch version register with the contents of the completion version register to restore the system to a state preceding the speculative execution of instructions.

6. A data processing system as set forth in claim 5, and further comprising:
   an update register;
   means for initializing the contents of the update register synchronously with initialization of the dispatch version register; and
   the means for copying initialization data into the completion version is connected between the update register and the completion version register for copying the contents of the update register into the completion version register.

* * * * *